United States Patent [19]

Greenslade

[11] Patent Number: 5,165,176
[45] Date of Patent: Nov. 24, 1992

[54] GAGE FOR MEASURING OUTER DIAMETERS

[76] Inventor: Joe E. Greenslade, P.O. Box 330865, Fort Worth, Tex. 76163

[21] Appl. No.: 848,869

[22] Filed: Mar. 10, 1992

[51] Int. Cl.$^5$ ............................................. G01B 3/40
[52] U.S. Cl. ........................... 33/199 B; 33/501.05; 33/805
[58] Field of Search .............. 33/199 R, 199 B, 555.1, 33/555.3, 829, 797, 803, 804, 805, 807, 501.05, 501.6, 542

[56] References Cited

U.S. PATENT DOCUMENTS

| | | | |
|---|---|---|---|
| 1,152,761 | 9/1915 | Provost | 33/804 |
| 1,238,714 | 8/1917 | Miller | 33/501.05 |
| 1,290,434 | 1/1919 | Walter | 33/501.05 |
| 1,499,730 | 7/1924 | Hanson . | |
| 1,840,538 | 1/1932 | Simmons | 33/803 X |
| 2,332,229 | 10/1943 | Jelley . | |
| 2,521,428 | 9/1950 | Vizuete . | |
| 2,557,073 | 6/1951 | Brink . | |
| 4,947,327 | 12/1990 | Greenslade . | |

FOREIGN PATENT DOCUMENTS 241025  8/1969  U.S.S.R. ............................. 33/199 B

Primary Examiner—Harry N. Haroian
Attorney, Agent, or Firm—James E. Bradley

[57] ABSTRACT

An improved gage for measuring the diameters of threaded members comprises a frame having two platforms extending therefrom, and a support member mounted to the frame for receiving threaded members to be measured. A gage member having a plunger is mounted to a first platform, a measuring shaft is mounted to a second platform, and a lever arm is pivotally mounted on a fulcrum member mounted to the frame. A first end of the lever arm is in contact with, but not physically attached to, an end of the measuring shaft. A second end of the lever arm is in contact with, but not physically attached to, an end of the plunger of the gage member. A mechanical relationship is defined between the plunger of the gage member, the measuring shaft, and the pivotally mounted lever arm that permits the gage member to directly measure the diameter of the threaded object.

3 Claims, 4 Drawing Sheets

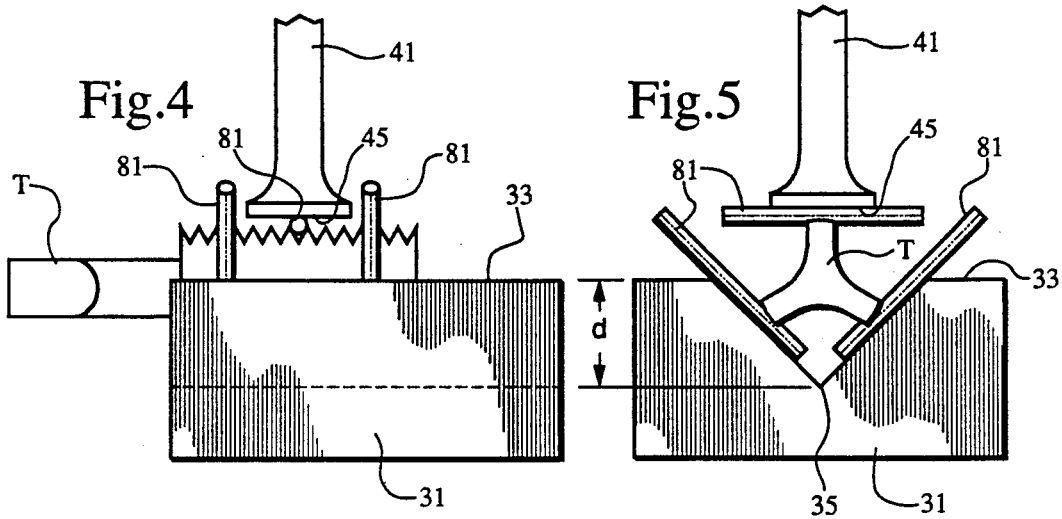
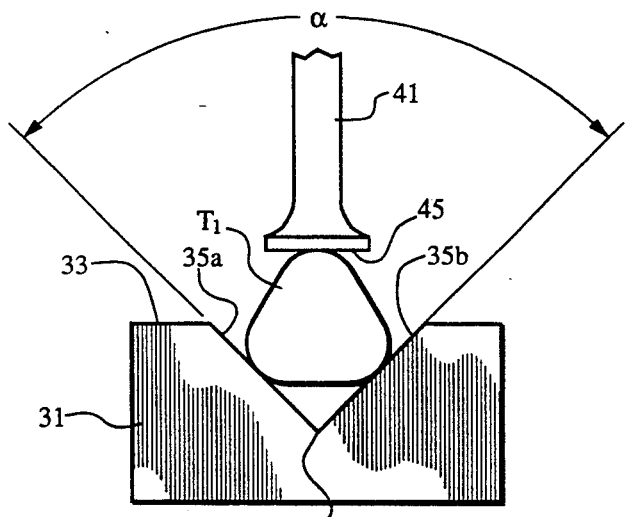
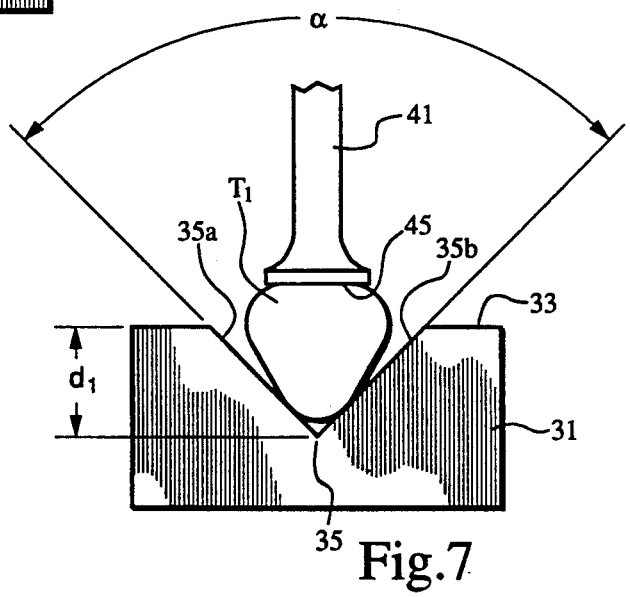

GAGE FOR MEASURING OUTER DIAMETERS

BACKGROUND OF THE INVENTION

1. Field of the Invention

This invention relates generally to gaging devices, particularly to gages for measuring diameters of non-round threaded objects.

2. Summary of the Prior Art

Precision measurement of the diameters of non-round threaded objects using hand-held micrometers, calipers, or the like can be very difficult, and yield inaccurate results. If the object to be measured becomes canted between the jaws or measuring points of a micrometer, the measurement can be inaccurate. Furthermore, a hand-held micrometer must be screwed closed to obtain a measurement. Overtightening of the micrometer can damage the object to be measured, and the degree of tightness can vary between measurements, rendering the measurements less accurate. Various solutions to this difficulty have been proposed in the prior art.

U.S. Pat. No. 1,499,730, Jul. 1, 1924, to Hanson discloses a micrometer body mounted to a frame provided with a V-block for measurement of threaded objects such as fluted taps. U.S. Pat. No. 2,332,229, Oct. 19, 1943 to Jelley discloses a V-block anvil to be attached to a micrometer body for measuring the diameter of threaded members. U.S. Pat. No. 2,521,428, Sep. 5, 1950, to Vizuete discloses another V-block anvil attachment for a micrometer, also for measuring diameters of threaded members. U.S. Pat. No. 2,557,073, Jun. 19, 1951, to Hanson discloses yet another V-block anvil for attachment to a micrometer body, for measurement of diameters of threaded objects. U.S. Pat. No. 4,947,327, Dec. 4, 1990, to a common inventor discloses a roller gage for measuring diameters of cylindrical threaded objects.

All of these prior art gages simplify the measurement of the diameters of generally cylindrical threaded objects by eliminating the need to carefully place the object to be measured within the jaws, or measuring points, of a micrometer. However, these prior art gages are not particularly adapted for measurement of non-round threaded objects, such as fluted taps and thread-rolling screws. Non-round threaded objects are particularly susceptible to misalignment in the jaws of a caliper or micrometer. Furthermore, the prior art gages are incapable of giving a measurement reading directly from the micrometer scale of the diameter that is measured. Further, these prior art gages require the use of a multiplying factor to convert the micrometer scale reading into an actual diametrical measurement.

The requirement of a multiplying factor complicates the use of these prior-art gages. Such complication increases the time required to measure an object, as well as increasing the possibility of error in the measurement.

SUMMARY OF THE INVENTION

It is a general object of the present invention to provide a gage for measuring the diameters of non-round threaded objects that is easy to use, accurate, and that does not require the use of cumbersome multiplying factors to obtain an accurate measurement.

This and other objects of the present invention are achieved by providing an improved gage for measuring the diameters of threaded members comprising a frame having a base, two platforms extending therefrom, a support member mounted to the frame for receiving threaded members to be measured. A gage member having a plunger is mounted to a first platform, a measuring shaft is mounted to a second platform, and a lever arm is pivotally mounted on a fulcrum member mounted to the frame. A first end of the lever arm is in contact with, but not physically attached to, an end of the measuring shaft. A second end of the lever arm is in contact with, but not physically attached to, an end of the plunger of the gage member. A mechanical relationship is defined between the plunger of the gage member, the measuring shaft, and the pivotally mounted lever arm that permits the gage member to directly measure the diameter of the threaded object.

Other objects, features, and advantages of the present invention will become apparent to one skilled in the art with reference to the following detailed description.

DESCRIPTION OF THE DRAWINGS

FIG. 4 is a fragmentary, enlarged, front elevation view of the gage of the present invention shown measuring the pitch diameter of fluted tap.

FIG. 5 is a fragmentary, enlarged, side elevation view of the gage device of the present invention shown measuring the pitch diameter of the fluted tap of FIG. 4.

FIG. 6 is a fragmentary, enlarged, side elevation view of the gage device of the present invention shown measuring the circumscribing diameter of a thread-rolling screw.

FIG. 7 is a fragmentary action view of the gage device of the present invention shown measuring the inscribing diameter of the thread-rolling screw of FIG. 6.

DETAILED DESCRIPTION OF THE INVENTION

Figure 1:
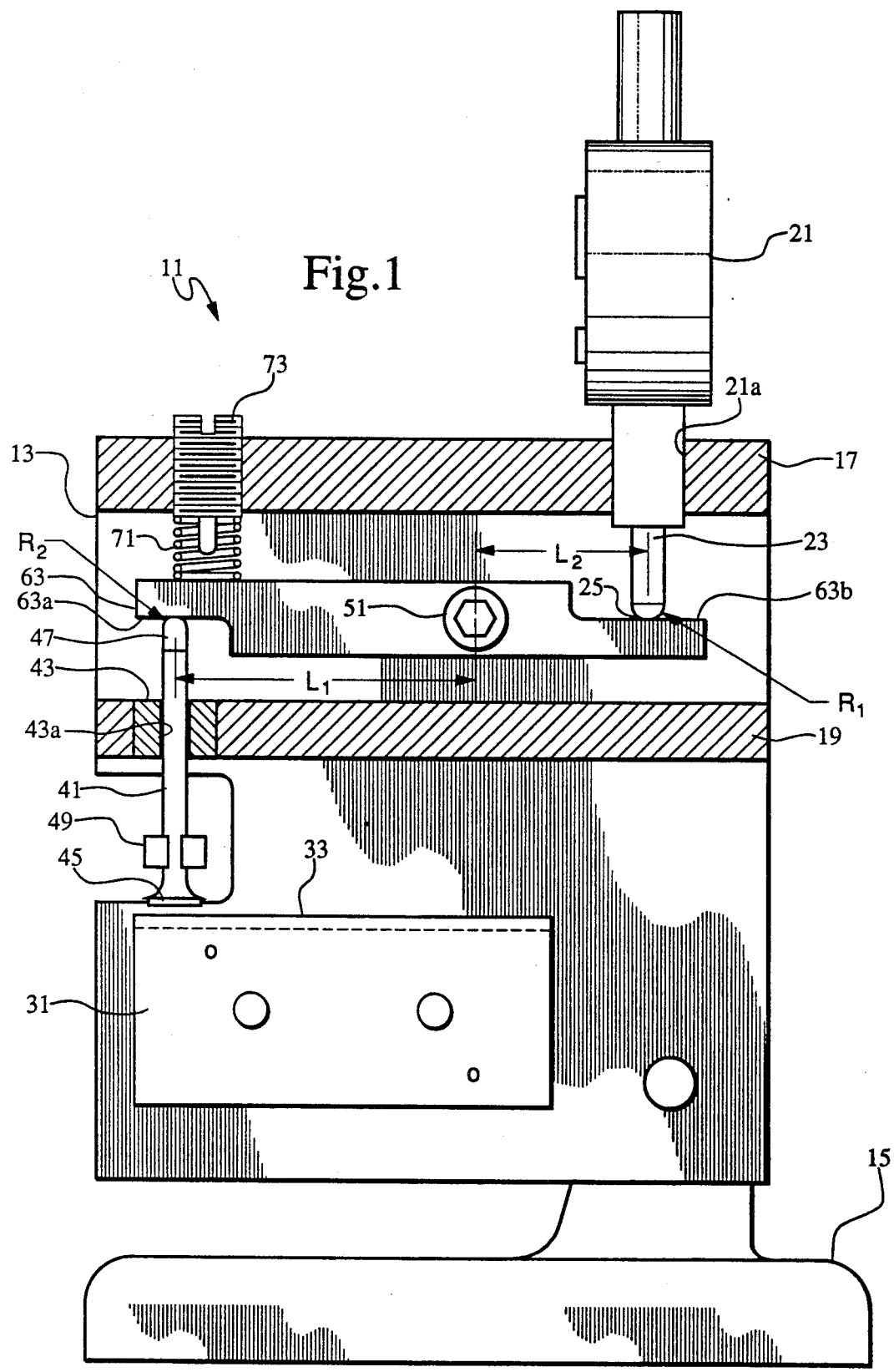
FIG. 1 is a partially sectional, front elevation view of the gage of the present invention.
Figure 2:
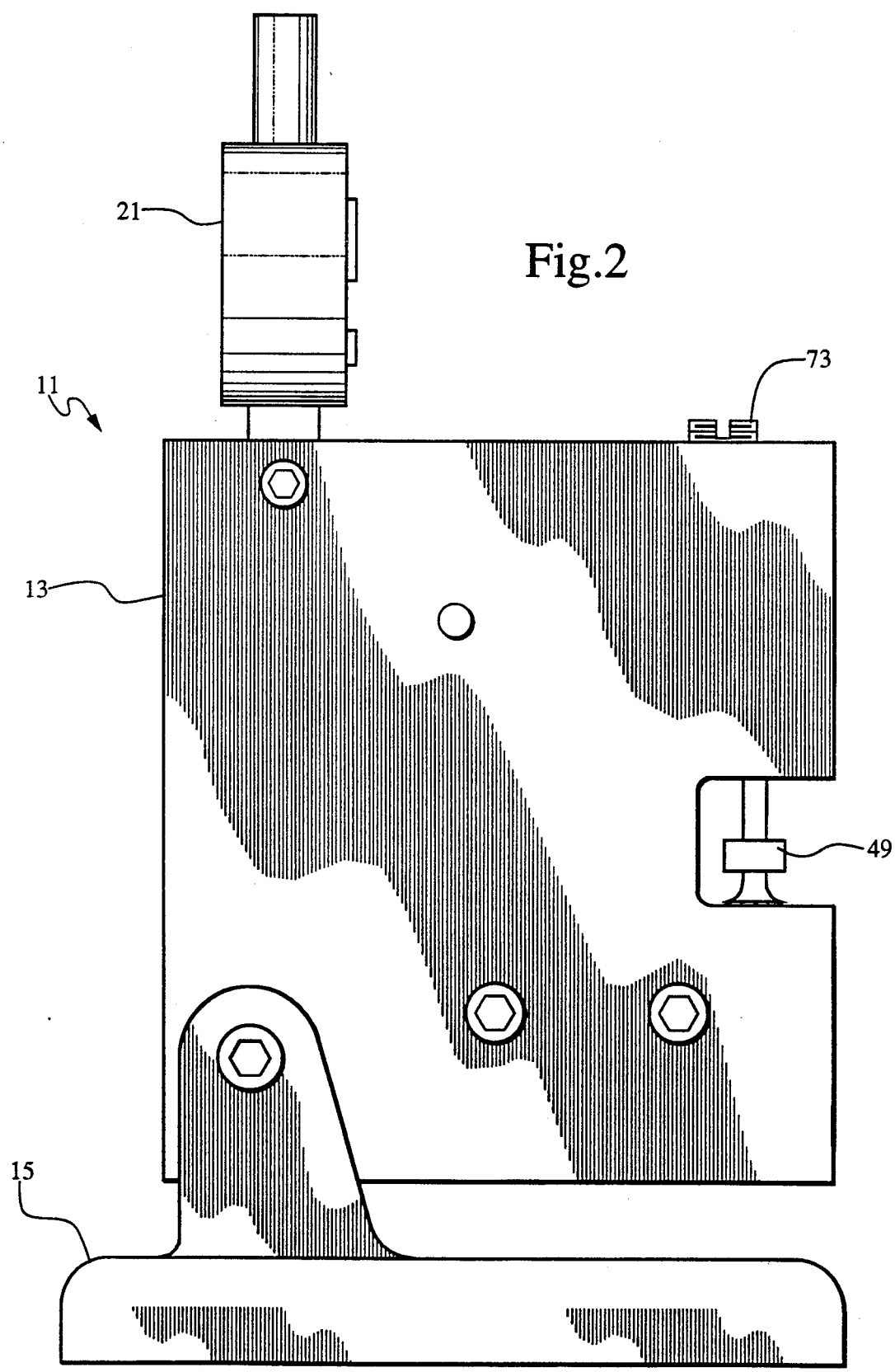
FIG. 2 is a rear elevation view of the gage of the present invention.
Figure 3:
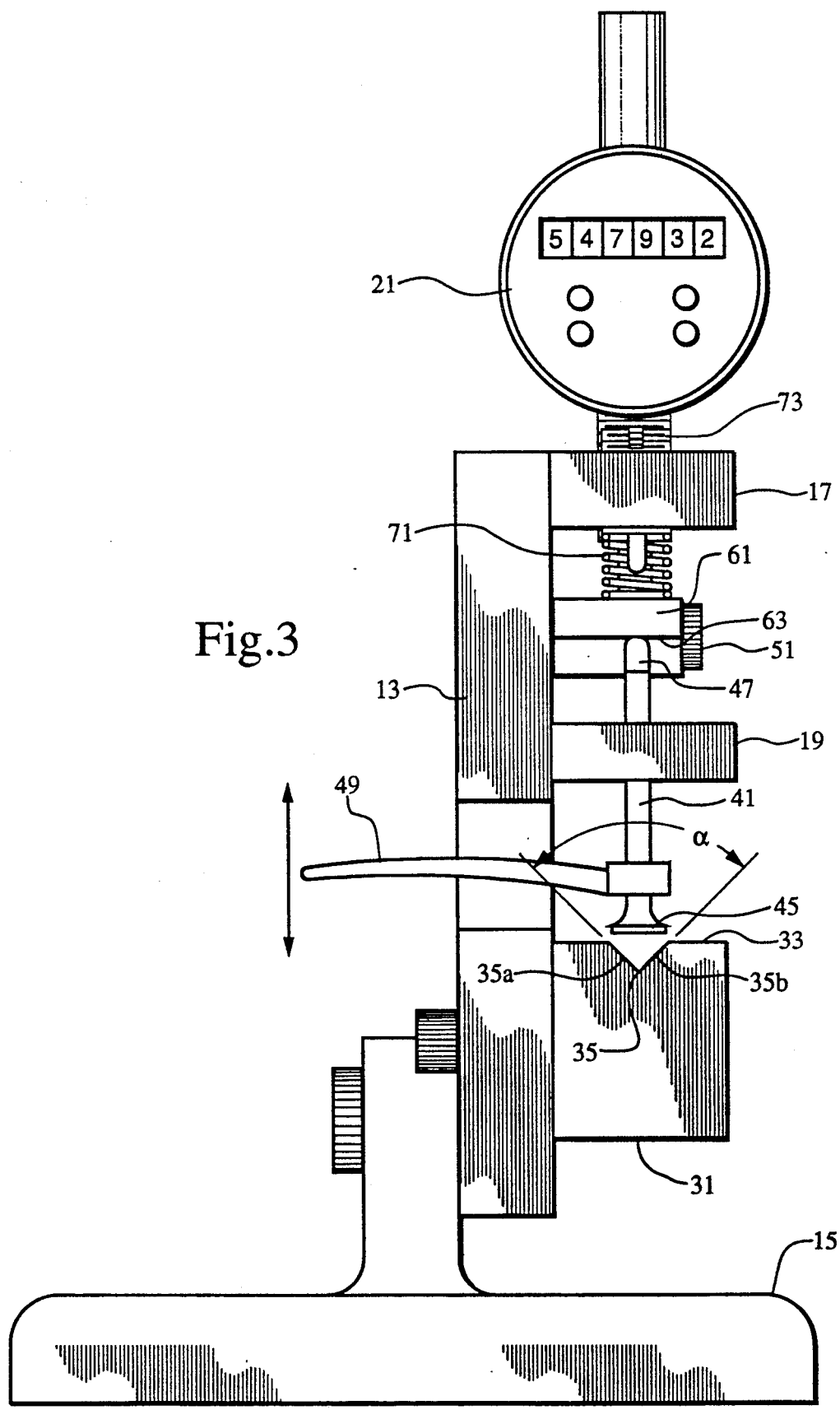
FIG. 3 is a side elevation view of the gage of the present invention.

FIGS. 1, 2, and 3 illustrate a gage 11 according to the present invention. Gage 11 has a frame 13 having base 15. Base 15 is provided so that the gage 11 may be used on any generally horizontal surface, such as a countertop. Frame 13 has mounting platforms 17 and 19 extending therefrom in a direction normal to a longitudinal axis of the frame 13.

A gage member 21 extends through a hole 21a in first platform 17. Gage member 21 includes plunger 23 extending downwardly therefrom, constrained for reciprocal motion in a plane parallel to a longitudinal axis of frame 13, in this case vertical reciprocal motion. Plunger 23 has an arcuate surface 25 of radius $R_1$ formed on its end. Gage member 21 may be of a conventional type known in the art. Gage member 21 must, however, have a presetting capability that allows the gage to be calibrated to read a given measurement when measuring an object of known diameter. An example of a gage member 21 suitable for use with the present invention is Mitutoyo indicator model no. 543-525, sold by the Mitutoyo Company of Japan.

Support member 31 is mounted to frame 13 below platforms 17, 19. Support member 31 has an upper planar surface 33 that is parallel to platforms 17, 19. Upper planar surface 33 has a receptacle groove 35 formed therein. In the preferred embodiment of the invention, receptacle groove 35 is a V-shaped groove defining a preselected angle alpha included between walls 35a, 35b (shown in FIG. 3). In the preferred embodiment of the present invention, the angle alpha included between walls 35a,35b is 60 degrees. Receptacle groove 35 is adapted to receive threaded objects to be measured using gage 11.

A measuring shaft 41 is disposed in a hole 43a of low-friction bushing or bearing 43, which is mounted to second platform 19. Measuring shaft 41 is constrained for motion in a plane parallel to a longitudinal axis of frame 13, in this case reciprocal vertical motion. Measuring shaft 41 is provided at one end with an enlarged, generally flat measuring surface 45 adapted to contact the threaded object to be measured. An opposite end of measuring shaft 41 has arcuate, or curved, surface 47 of a preselected radius $R_2$ formed thereon. Measuring shaft 41 is further provided with lifting arm 49, which is adapted to aid in manually raising and lowering shaft 41, and contact surface 45, in and out of contact with a threaded object to be measured.

A lever arm 63 is pivotally mounted to frame 13 by means of fulcrum member 51. In the preferred embodiment, fulcrum member 51 is simply a bolt; however, various other fulcrum members adapted to permit pivotal motion of lever arm 63 may be used in accordance with the present invention. Lever arm 63 has a first, flat, downward-facing contact surface 63a formed on one end. First flat, downward-facing contact surface 63a is in contact with, but not physically attached to, arcuate surface 47 formed on measuring shaft 41. An opposite end of lever arm 63 has a second, flat, upward-facing contact surface 63b formed thereon. Second flat, upward-facing contact surface 63b is in contact with, but not physically attached to arcuate surface 25 formed on plunger 23 of gage member 21. Lever arm 63 serves to translate reciprocal vertical motion of contact surface 45 of measuring shaft 41 into reciprocal vertical motion of plunger 23 of gage member 21.

As will be more fully discussed with reference to the operation of the present invention, the arcuate surface 47 of measuring shaft 41, first contact surface 63a of lever arm 63, second contact surface 63b of lever arm 63, and arcuate surface 25 of plunger 23 of gage member 21 combine in operation to provide a mechanical multiplying factor so that a diametrical measurement of a non-round threaded member may be read directly from gage member 21 without use of cumbersome multiplying factors.

The arcuate surfaces 47, 25 formed on the ends of measuring shaft 41 and plunger 23 permit smooth transfer of motion from measuring shaft 41 to lever arm 63, and in turn to plunger 23. The lever arm 63 is of a preselected dimension to define a distance $L_1$, from the point of contact between arcuate surface 47 of measuring shaft 41, to the center of fulcrum member 51. Also, the overall length of lever arm 63 should be selected such that a second distance $L_2$ is defined between the center of fulcrum member 51 and the contact point between flat surface 63b of lever arm 63 and arcuate surface 25 on plunger 23 of gage member 21.

The ratio of $L_1$ to $L_2$ defines a mechanical multiplying factor that permits direct reading of a diametrical measurement from gage member 21. The presence of this mechanical multiplying factor eliminates the necessity of manually multiplying a measurement reading to obtain the actual diametrical measurement. The selection of the multiplying factor, whether mechanical (as in the present invention) or manual, depends on the angle alpha included between walls 35a, 35b of the receptacle groove 35. According to the present invention, included angle alpha is 60 degrees, therefore, the multiplying factor is 1.5. That multiplying factor is included in the present invention by making the ratio of $L_1$ to $L_2$ equal to 1.5 to 1. Specifically, lever arm 63 of the present invention is 6 inches long, and defines $L_1$ as 3 inches, and $L_2$ as 2 inches.

Further, the radii $R_1$, $R_2$ of the arcuate surfaces 25, 47 of plunger 23 and measuring shaft 41, respectively, are in a ratio identical to that of the ratio of $L_1$ to $L_2$. Thus, in the present embodiment of the invention, $R_1$ is 1.5 times larger than $R_2$. Stated more plainly, in the preferred embodiment of the present invention, the ratio $L_1$ to $L_2$ is equal to the ratio $R_1$ to $R_2$, and the ratio is 1.5:1.

A spring 71 is mounted to first platform 17 by spring retainer screw 73. Spring 71 is positioned intermediate first platform 17 and lever arm 63, to bias the lever arm 63, measuring shaft 41, and contact surface 45 of measuring shaft 41, to insure a uniform and repeatable measuring force between the contact surface 45 and the threaded object to be measured. Spring retaining screw 73 permits the biasing force exerted by spring 71 to be adjusted by increasing or decreasing the pressure on the upper extent of spring 71.

With reference now to FIGS. 4 and 5, the operation of the gage of the present invention will be discussed. The operation depicted in FIGS. 4 and 5 is the measurement of the pitch diameter of a non-round threaded object T, in this case, a fluted tap. Four conventional thread measuring wires 81 are disposed in the receptacle groove 35 of the present support member 31 of the gage 11. The threaded object T is placed in receptacle groove 31 such that the four thread measuring wires engage the threads of the object T. A fifth measuring wire 81 then is disposed in engagement with threads on an upper surface of threaded object T. The contact surface 45 of measuring shaft 41 is placed in contact with the upper measuring wire 81. The measurement of the pitch diameter then is read from the gage member 21 (shown in FIG. 1).

FIGS. 6 and 7 depict the operation of the gage of the present invention in measuring thread-rolling screws T'. These screws are designed to be self-tapping, and roll-form clean screw threads as they are screwed into the work piece. Such screws T' are roughly triangular in cross-section, and define a circumscribing diameter through the apexes of the triangular cross-section, and an inscribing diameter through the midpoints of the relatively flat sides of the triangular cross-section. Measurement of the circumscribing and inscribing diameters of thread-rolling screws T' is an important part of the inspection process for such screws. FIG. 6 illustrates the measurement of the circumscribing diameter of a thread-rolling screw T'. Two of the apexes of the triangular cross-section are abutted against walls 35a, 35b of receptacle groove 35 in support member 31. Contact surface 45 of measuring shaft 41 is placed upon the third apex of the screw T', and the circumscribing diameter measurement is read from gage member 21.

FIG. 7 illustrates the measurement of an inscribing diameter of thread-rolling screw T'. Two of the relatively flat sides of thread-rolling screw T' are abutted against walls 35a, 35b of receptacle groove 35 and support member 31. Contact surface 35 of measuring shaft 41 is placed in contact with a third relatively flat side of thread-rolling screw T'. The inscribing diameter measurement then is read from gage member 21.

The calibration procedure for the gage of the present invention is not illustrated, but will be discussed with reference to FIGS. 1, 2, and 3. A cylindrical gage block 5 of a known precise diametrical dimension is placed in the receptacle groove 35 of support member 31 of gage 11. Contact surface 45 of measuring shaft 41 is placed in contact with the gage block. Gage member 21 then is preset (using the aforementioned presetting capability) to read the exact measurement of the diameter of the gage block. After this procedure, the gage 11 of the present invention is fully calibrated and will accurately and directly measure diameters of threaded objects without further calibration.

The gage of the present invention has significant advantages. One advantage is that the gage is not hand-held, and thus is not susceptible to damage incurred by dropping a prior-art, hand-held micrometer. Another advantage of the gage of the present invention is that the gage reads the exact diametrical measurement without the use of cumbersome multiplying factors. Still another advantage of the present invention is that measurement errors attributable to an operator's over- or undertightening of prior art micrometers are eliminated. A further advantage of the present invention is that it is particularly well-suited for simple and accurate diametrical measurement of non-round threaded objects such as fluted taps and thread-rolling screws. The unique mechanical arrangement of the present invention provides an easy-to-use gage that makes accurate and repeatable diametrical measurements of threaded objects.

The present invention has been described with reference to a preferred embodiment. One skilled in the art will appreciate that the present invention is thus not limited, but is susceptible to changes and variations without departing from the scope of the invention.

I claim:

1. An apparatus for measuring diameters of threaded members comprising in combination:
    a frame having a longitudinal axis, a base, and a plurality of mounting platforms extending outwardly therefrom in a direction normal to the longitudinal axis of the frame;
    a gage member mounted to a first mounting platform, the gage member having a measuring plunger for movement in a plane parallel to the longitudinal axis of the frame, the measuring plunger having a measuring end;
    a support member secured to the frame and having a surface normal to the longitudinal axis of the frame, the surface having a groove fabricated therein for receiving and positioning the threaded member to be measured;
    a measuring shaft extending through and slidably engaged in a hole in a second mounting platform for movement in a plane parallel to the longitudinal axis of the frame, the measuring shaft having a first end with a contact surface for contacting the threaded member to be measured;
    a fulcrum member extending laterally from the frame at a position intermediate the first mounting platform and the second mounting platform;
    a lever arm rotatably secured about the fulcrum member, and having a first flat end in contact with, but not connected to, a second end of the measuring shaft and a second flat end in contact with, but not connected to, the measuring end of the measuring plunger, the lever arm being rotatable in a plane parallel to the longitudinal axis of the frame for translating the movement of the measuring shaft into movement of the end of the measuring plunger; and
    a lifting member attached to the measuring shaft for manually raising and lowering the measuring shaft whereby the contact surface of the measuring shaft is moved in and out of contact with the threaded member to be measured.

2. An apparatus for measuring diameters of threaded members comprising in combination:
    a frame having a longitudinal axis, a base, and a plurality of mounting platforms extending outwardly therefrom in a direction normal to the longitudinal axis of the frame;
    a gage member mounted to a first mounting platform, the gage member having a measuring plunger for movement in a plane parallel to the longitudinal axis of the frame, the measuring plunger having a measuring end;
    a support member secured to the frame and having a surface normal to the longitudinal axis of the frame, the surface having a groove fabricated therein for receiving and positioning the threaded member to be measured;
    a measuring shaft extending through and slidably engaged in a hole in a second mounting platform for movement in a plane parallel to the longitudinal axis of the frame, the measuring shaft having a first end with a contact surface for contacting the threaded member to be measured;
    a fulcrum member extending laterally from the frame at a position intermediate the first mounting platform and the second mounting platform;
    a lever arm rotatably secured about the fulcrum member, and having a first flat end in contact with, but not connected to, a second end of the measuring shaft and a second flat end in contact with, but not connected to, the measuring end of the measuring plunger, the lever arm being rotatable in a plane parallel to the longitudinal axis of the frame for translating the movement of the measuring shaft into movement of the end of the measuring plunger; and
    a biasing member attached to the first mounting platform for providing a biasing force to the lever arm and the measuring shaft to maintain contact between the contact surface of the measuring shaft and the threaded member to be measured.

3. A method of measuring a diameter of an elongate three-sided threaded member having a longitudinal axis and having three rounded corners at the intersections of each of the three sides comprising the steps of:
    assembling a measuring apparatus comprising in combination:
    a frame;
    a gage member mounted to the frame, the gage member having a measuring plunger constrained for vertical movement relative to the frame, the measuring plunger having a lower end;
    a support member mounted to the frame, the support member having a v-shaped groove therein for receiving and positioning the threaded member to be measured;
    a measuring shaft carried by the frame and constrained for vertical movement relative to the frame, the measuring shaft having a lower end with a contact surface for contacting the threaded member to be measured; and a lever arm pivotally mounted to the frame, and having a first end in contact with, but not attached to, an upper end of the measuring shaft, and having a second end in contact with, but not attached to, the lower end of the measuring plunger of the gage member, the lever arm being pivotal about a fulcrum intermediate the first and second ends of the lever arm for translating a vertical motion of the measuring shaft into a vertical motion of the measuring end of the measuring plunger;

placing the threaded member into the v-shaped groove wherein a first and second of the three sides abut a first and second walls of the v-shaped groove;

placing the contact surface of the measuring shaft into contact with a third side of the threaded member, thereby measuring a first diameter of the threaded member;

rotating the threaded member through 120 degrees, wherein a first and second of the three rounded corners abut the first and second walls of the v-shaped groove; and placing the contact surface of the measuring shaft into contact with a third of the three rounded corners, thereby measuring a second diameter of the threaded member.

* * * * *